M. Andrew,

Door Knob.

No. 4,114. Reissued Sept. 6. 1870.

Witnesses.
C. Wahlers
E. F. Kastenhaber

Inventor:
M. Andrew
per
Van Santvoord & Hauff
Att'ys

N. PETERS, PHOTO-LITHOGRAPHER, WASHINGTON, D. C.

United States Patent Office.

MATTHEW ANDREW, OF MELBOURNE, VICTORIA.

*Letters Patent No.* 101,808, *dated April* 12, 1870; *reissue No.* 4,114, *dated September* 6, 1870.

IMPROVEMENT IN ATTACHING KNOBS TO SPINDLES.

The Schedule referred to in these Letters Patent and making part of the same

*To all whom it may concern:*

Be it known that I, MATTHEW ANDREW, of Melbourne, Colony of Victoria, have invented a new and useful Improvement in Attaching Knobs to Spindles; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
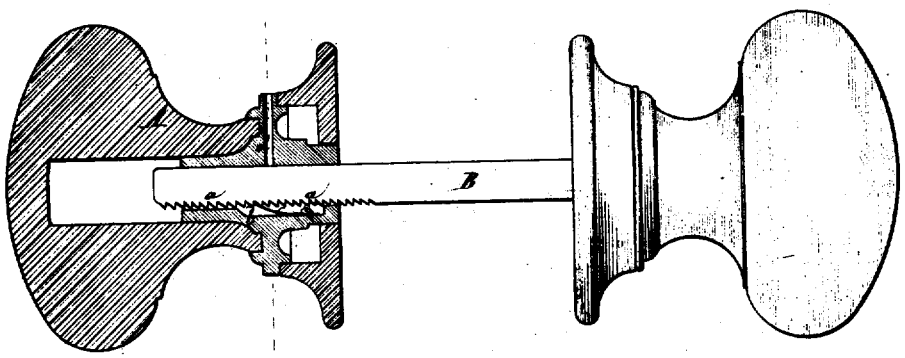
Figure 1 represents a sectional side elevation of this invention.

This invention relates to an improvement in that class of door-knobs which is fastened on their spindles by a spring-catch and ratchet-teeth, so that the distance between the two knobs can be readily adjusted to correspond to the thickness of the door to which they are to be attached.

My invention consists in the arrangement of a spring-catch extending beyond the side of the spindle, in combination with a hole, extending through the shank of the knob, and situated at the side of the spindle, in such a manner that, by inserting a brad-awl or other like instrument into the hole in the knob, the spring can be forced back, and the knob released, while the spindle retains its full strength.

In the drawing—

The letter A designates a door-knob, made of any suitable material, and provided with a socket to receive the spindle B.

One side of this spindle is provided with a series of ratchet-teeth, *a*, and in the socket of the knob is formed a chamber, *b*, to receive the spring-catch *c*.

If the spindle is pushed into its socket, this spring-catch engages with the ratchet-teeth, and retains said spindle, the ratchet-teeth being so formed that they slide over the catch when the spindle is pushed in; but they do not allow of the spindle being withdrawn.

Figure 2:
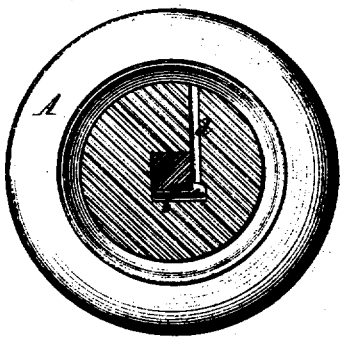
Figure 2 is a transverse section thereof.

In order to release the spindle, the spring-catch has to be pressed back; and to effect this purpose I make the spring catch so that it projects over one side of the spindle; and in the shank of the knob I produce a hole, *d*, which passes down at the side of the spindle opposite the projecting portion of the spring-catch, best seen in fig. 2 of the drawing.

By inserting a brad-awl or other similar instrument into this hole, the spring-catch can be readily pressed back, and the spindle released.

I am aware that a spindle provided with ratchet-teeth as a means for securing the same in the knob has already been used; but in all cases of this kind known to me the spindle is provided with a slot, through which the instrument for disengaging passes, and by such slot the construction of the spindle is rendered extremely difficult; and, furthermore, the spindle is weakened, so that it is liable to be wrenched off in a short time.

By my invention, I am enabled to dispense with the slot in the spindle, so that said spindle can be easily made, and that it retains its full strength.

I do not claim broadly as my invention the arrangement of ratchet-teeth and a catch for the purpose of fastening door-knobs on their spindles; but

Having thus described my invention,

What I claim as new, and desire to secure by Letters Patent, is—

The spring-catch C, arranged to project over one side of the spindle B, in combination with a hole, *d*, in the shank of the knob, at one side of the spindle, substantially as and for the purpose described.

Witnesses: MATTW. ANDREW.

W. HAUFF,

CHAS. WAHLERS.